Oct. 8, 1946. C. A. FRISCHE ET AL 2,408,770
ELECTRO-HYDRAULIC CONTROL SYSTEM
Filed Nov. 19, 1942 2 Sheets-Sheet 1
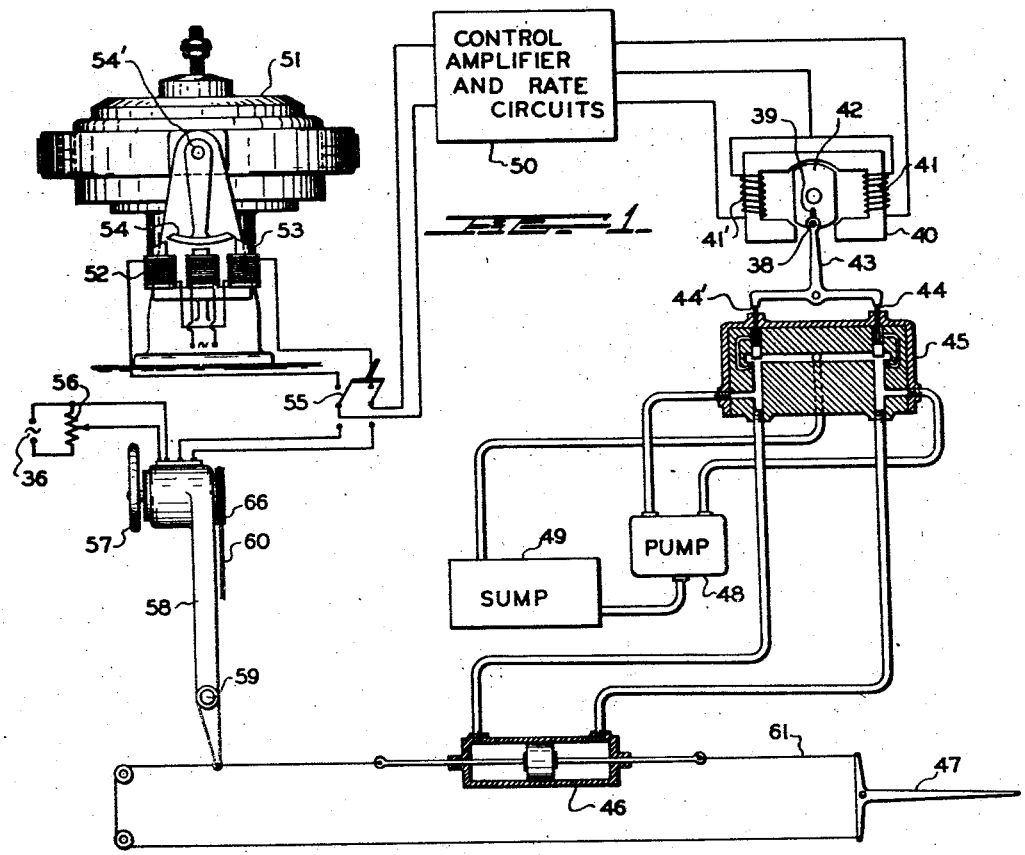
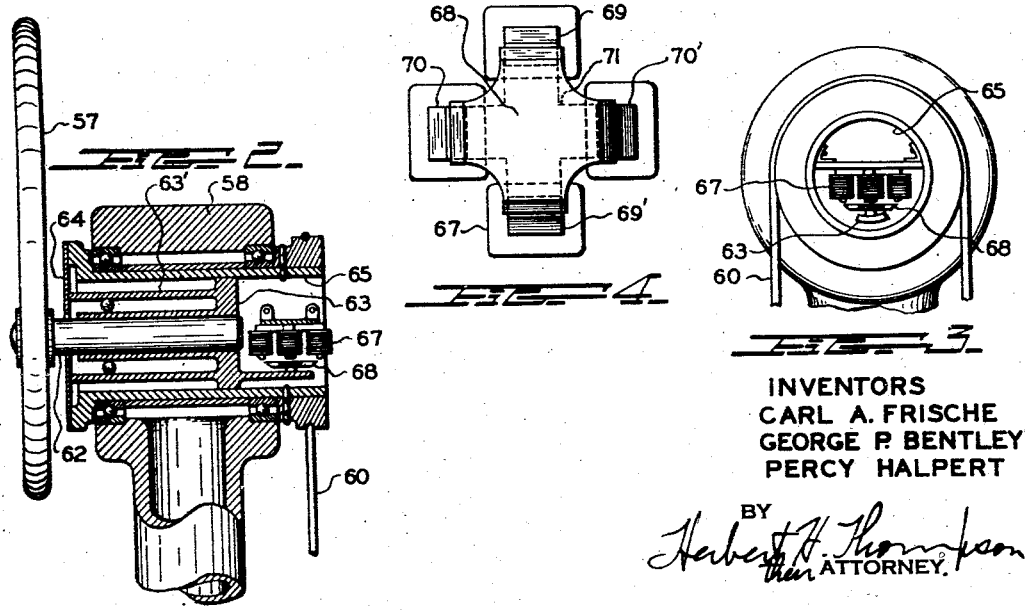
INVENTORS
CARL A. FRISCHE
GEORGE P. BENTLEY
PERCY HALPERT
BY
Herbert H. Thompson
ATTORNEY.

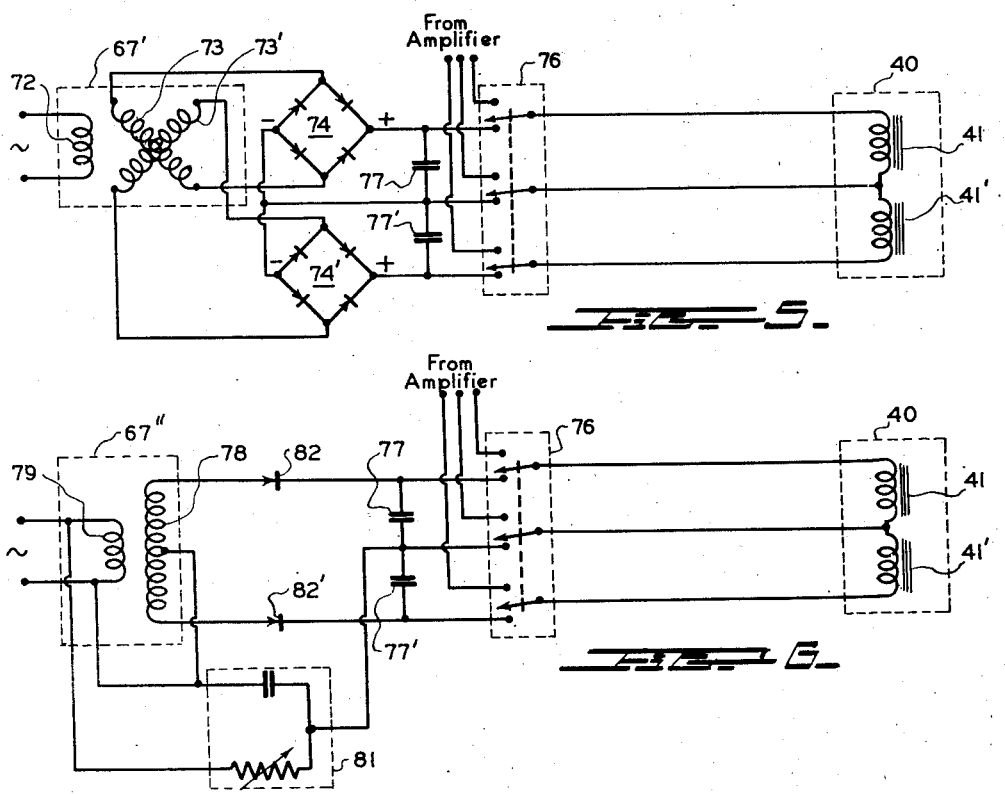

Patented Oct. 8, 1946

2,408,770

UNITED STATES PATENT OFFICE 2,408,770

ELECTROHYDRAULIC CONTROL SYSTEM

Carl A. Frische, Great Neck, George P. Bentley, Garden City, and Percy Halpert, Kew Gardens, N. Y., assignors to Sperry Gyroscope Company, Inc., Brooklyn, N. Y., a corporation of New York Application November 19, 1942, Serial No. 466,208

6 Claims. (Cl. 244—83)

The present invention is related to the art including booster servo systems, such as for actuating the control surfaces of large aircraft, but also having many other uses. The present application constitutes a continuation-in-part of our prior copending application Serial No. 284,642, for Electrohydraulic control systems, filed July 15, 1939.

The large size of present-day aircraft renders it almost impossible for the aviator to manually actuate the control surfaces to guide or control the craft, in view of the large forces so required. According to the present invention, the force exerted by the aviator is effectively multiplied by a booster servo system, and this multiplied force as well as the original force is applied to the control surface of the aircraft.

In the present case, this is preferably done by directly connecting the manual control to the control surface through an elastic member whose stretch or yield is measured by suitable pick-off means, the output of the pick-off being utilized to exert a corresponding and preferably multiplied force upon the control surface by means of a servo system, which is described in detail and claimed in our copending parent application Serial No. 284,642. This servo system is of the non-locking type, whereby, upon failure of any part of the system, direct manual control is still effective by actuating the manual control in the same manner as when using the booster system, without requiring any switching over or other control action.

The servo system here utilized is of the pressure reactive or pressure repeat-back type whereby the entire servo may be located at a point remote from the control station and preferably close to the surface to be controlled, being connected to the control station only by suitable electrical connections. Suitable rate circuits are used to assure quick and non-hunting response. The same servo system may also be utilized alternatively with an automatic pilot, responsive, for example, to an attitude-determining instrument such as a gyro vertical, a directional gyro, a magnetic compass, etc.

Accordingly, it is an object of the present invention to provide an improved booster control system for aircraft or other systems operative to supply a greatly multiplied force from a manual controller to the aircraft control surfaces or other controlled object.

It is another object of the present invention to provide an improved booster control system in which a manual control is directly connected to the aircraft control surfaces for direct control thereof and in which the force supplied to the manual control is multiplied by a booster system also actuating the control surface.

It is a further object of the present invention to provide an improved aircraft or other type booster servo system, in which the force applied to a manual controller is transmitted directly to the control surface or controlled object through an elastic member whose yield controls the application of a greatly multiplied force to the controlled object.

It is still another object of our invention to provide a booster system whereby the "feel" of the controls is retained; that is, a system whereby the aerodynamic forces acting on the aircraft control surfaces are felt by the pilot in exact proportion to their actual magnitude, but to a lesser extent.

Other objects and advantages of the present invention will be apparent from the following specification and drawings, wherein, Fig. 1 shows a schematic diagram of one type of complete system of the invention.

Fig. 2 shows an elevational cross-sectional view of a portion of the controller of Fig. 1.

Fig. 3 shows a partial end elevational view of the apparatus of Fig. 2.

Fig. 4 shows a bottom view of the pick-off apparatus of Figs. 2 and 3.

Fig. 5 shows a modified form of a portion of the system of Fig. 1, and

Fig. 6 shows a further modification of the invention of Fig. 5.

Referring to Fig. 1, we illustrate one embodiment of our invention as applied to a system providing means for controlling an aircraft alternatively by means of an automatic pilot through a servo system or manually through the same servo system. It is to be understood, however, that our booster servo system is not restricted to this use, but may be generally used. Reference number 51 applies generally to a gyroscopic control instrument of an automatic pilot, for example, the bank and climb control gyro, which maintains fixed attitude with respect to the earth. Such instruments are well known in connection with automatic pilots of the type described in U. S. Patent No. 1,992,970, issued March 5, 1935, to E. A. Sperry et al.

A pick-off 52 on one axis of this gyro, illustrated as the pitch axis, is shown as a three-legged transformer pick-off forming one type of control signal generating means for producing a reversible-phase variable-magnitude control signal voltage, corresponding in phase and magnitude to the sense and magnitude of displacement of the craft from a predetermined attitude in pitch, as determined by the attitude maintained by the gyro unit 51. This pick-off 52 has a three-legged core member 53 whose inner leg carries an exciting winding energized from a suitable source of alternating current and whose outer legs carry the two halves of the oppositely-connected signal output windings. Core 53 is supported from the housing of the instrument carried by the craft, and a magnetic armature 54 is supported from a shaft 54' connected to the gyro rotor housing. The angular displacement of shaft 54' with respect to the housing disturbs the normal balance of the electro-motive forces induced by the exciting winding in the two halves of the signal output winding of the pick-off 52 and thereby generates the control signal referred to.

When a relative displacement occurs between armature 54 and core 53, due to a change in the relative attitudes about the axis of shaft 54' of the craft carrying core 53 and the gyro 51 carrying the armature 54, a control signal voltage is generated in the signal winding of the pick-off 53, which is applied through a double-pole double-throw switch 55 (when in the up position) to the input terminals of a control amplifier 50 of any suitable type. Preferably such an amplifier is of the form shown diagrammatically in Figs. 1 or 2 of our above-mentioned parent application Serial No. 284,642, and produces from this control signal voltage a pair of differentially varying direct current outputs whose difference has components corresponding to the control signal magnitude and to the first and second time derivatives of the control signal magnitude, and a polarity corresponding to the sense of the control signal and its time derivatives. As is described in this application Serial No. 284,642, these derivative components prevent hunting or lag in the control system, and assure prompt action without producing oscillations of the craft or control apparatus.

These output differential currents are then applied to the respective windings 41 and 41' of a torque motor 40, to control the hydraulic servo system of our above copending application Serial No. 284,642. Torque motor 40 consists of a magnetic core having two legs on which are mounted the windings 41 and 41', these windings being so connected as to cause respective fluxes to flow in the same direction through an armature member 42 common to the two magnetic circuits of windings 41' and 41. Armature member 42 is suitably pivoted within the core structure, the ends of the armature being in the form of circular arcs that cooperate with the respective adjacent legs of the core and with the base of the core. The construction provides that a constant air gap be maintained between the armature 42 and the core, even when the armature is angularly displaced.

An unbalance in the two currents applied to windings 41, 41' will produce a torque tending to rotate armature 42 toward the coil carrying greater current. By the present construction, the torque thus produced varies substantially linearly with respect to the current difference, at least up to a predetermined maximum value. Accordingly, the output torque produced by armature 42 may be considered to be proportional to the output of amplifier 50. This output torque actuates a three-armed lever 43 by virtue of a slot 39 in armature 42 which engages a ball end 38 of lever 43. Lever 43 oppositely actuates the stems 44 and 44' of the piston valves of a balanced fluid valve 45.

A complete description of the construction and operation of the balanced fluid valve here used has been previously given in prior copending application Serial No. 259,178, filed March 1, 1939, in the names of G. P. Bentley et al. and assigned to the same assignee as the present application. Accordingly, it is not believed necessary to repeat or to show in detail all the features of the system in the present case. In general, however, it may be said that the torque exerted by the armature 42 of torque motor 40 on lever 43 operates differentially on the two piston valves of the balanced oil valve 45 to differentially change the fluid pressure applied to the two ends of the reversible hydraulic motor 46, which is directly connected to and causes rotation of the aircraft control surface 47, and thereby creates an effect tending to restore the attitude of the craft to the predetermined attitude determined by the gyro attitude.

In the present system, the force opposing motion of the control surface, such as that due to air flow past the surface, reacts back through valves 44, 44' and lever 43 to oppose and balance the torque produced by means of torque motor 40. Hence, no centralizing means is required for the torque motor 40. As described in the prior applications above referred to, valve 45 produces a force multiplication, so that a relatively small torque produces a large pressure.

Accordingly, the control surface 47 will be displaced to a position at which the force of the air or other surrounding medium on control surface 47 just balances the force produced by the pressure applied to servo 46.

It will be noted that the present system requires no mechanical repeat-back from the control surface 47 or the servo 46 to the controlling member, as in prior systems, such as in the Patent No. 1,992,920, in which the system controls the position of the control surface 47 in correspondence with the control signal, instead of controlling the force applied to the control surface in accordance with the control signal, as in the present system. Systems of the present type have come to be known as "pressure repeat-back" systems, in distinction to the former type of "displacement" or "position" repeat-back systems, and have the great advantage that, for a given control signal, the same resultant control effect on the craft is produced, independently of the craft speed.

It will be understood that a different type of torque motor 40 may be utilized, if desired, and may include any desired non-linear relationship between current and torque, if required by the particular system. Also, other types of signal pick-off different from pick-off 52 may be utilized. For example, a resistance bridge circuit may have one or more arms balanced by action of the gyro 51 to produce a signal as in application Serial No. 284,642, or the control signal may be generated by other well known means, such as a self-synchronous or "Selsyn" type of transmitter used as a signal generator, or an alternating current inductive transmitter such as described in U. S. Patent No. 2,054,945, issued September 22, 1936, to R. H. Nisbet.

For the sake of simplicity the form of our invention illustrated by the control system of Fig. 1 is shown in connection with only one axis of the "bank and climb" gyro. Obviously the system may be used in connection with the other axis of the gyro. Also, it will be understood that similar apparatus may be, and normally will be, employed to control the course of the craft in connection with a direction-maintaining instrument, such as the conventional directional gyro of an automatic pilot. In this manner, the craft is automatically maintained in a predetermined heading and attitude.

The present invention is also provided with a manual control in the form of a control member 57 carried by control column 58. Member 57 is capable of rotation through a limited arc about the axis of shaft 62 (Fig. 2) and thereby moves a pulley to control cable 60 and causes banking of the craft by a direct connection to the ailerons (not shown). Column 58 is mounted for limited rotation about pivot point 59 to control the climbing and diving of the craft by directly rotating elevator surface 47 through the control cables 61.

On large aircraft, direct manual operation of the control surfaces requires that considerable force be applied at the control, which is very tiring for the aviator and is generally beyond his strength. It is one object of our invention to make use of our improved servo system in connection with pick-offs associated with the manual controls, which generate electric signals for the actuation of the servo system with the exertion of little force at the controls, and still retaining means for direct operation in case of emergency.

The association of pick-offs with aileron control member 57 and elevator control column 58 is shown in detail in Fig. 2 and Fig. 3. Member 57 is rigidly mounted on a stub shaft 62 carrying a flange 63, which has a torsionally elastic member fixed thereto in the form of a thin sleeve 63', attached at its other end to a yieldable plate or diaphragm 64. The outer part of diaphragm 64 is attached to a rigid sleeve 65 mounted for rotation in anti-friction bearings seated in the enlarged head of control column 58. Sleeve 63' is concentric to the axis of the stub shaft 62. Plate 64 is arranged normal to the axis of the stub shaft. On sleeve 65 is mounted the core of a pick-off transformer 67 whose cooperating armature 68 is carried by the flange 63, by a suitable extension thereof. The construction of pick-off transformer 67 is shown more particularly in Fig. 4, and is one form of device for generating independent electric signals in response to displacement along or about two axes.

A cruciform core, comprising a central pole piece 71 which carries an exciting winding suitably energized by alternating current from source 36 through voltage adjuster 56, and also comprising two pairs of symmetrically disposed outer pole pieces 69, 69' and 70, 70' which carry two signal windings, each divided between opposite poles, is the equivalent of two of the three-legged signal transformers or pick-offs described in Fig. 1, the central or exciting pole 71 being common to the two transformers. Cooperating armature 68 is likewise of cruciform construction, and is normally centered on transformer 67 so that the voltages generated in opposite halves of both signal windings annul one another in their outputs. A displacement from this central or balanced position along a line joining either pair of signal poles generates a reversible-phase variable-magnitude control signal corresponding in magnitude and phase to the magnitude and sense of the displacement. Since the core of transformer 67 is carried on sleeve 65 and armature 68 is carried on an extension of the flange 63, a signal will be generated in response to relative motion between the sleeve 65 and flange 63 in either of two directions. Relative motion along the line joining one pair of signal poles may be produced by a force applied to control column 58 tending to rock it about pivot point 59, thereby producing flexure of diaphragm 64. This displacement need be of the order of only a few thousandths of an inch to generate a signal which, when amplified and rectified, is sufficient to cause torque motor 40 to move elevator control surface 47 through a relatively large angle. Pick-off 67 effectively responds to the small elastic distension of sleeve 63' or diaphragm 64. Thus, when the servo booster system is operating, only a relatively small force need be exerted by the aviator to control the climbing and diving of the craft. The direct connection of the piston of hydraulic motor 26 to cable 61 operated by control column 58 for rotating elevator surface 47, however, makes it possible to move surface 47 either through the servo booster system, or, in an emergency and by the exertion of greater force, directly, without any change of control connections.

In this connection it may be noted that direct manual control through the manual controller 57, 58 may readily be effected at all times regardless of the position of the switch 55, since the hydraulic control system (shown in detail in Fig. 1) is of the continuous flow or non-locking type, in which the control valves 44 and 44' are both normally open, as distinct from the closed or self-locking hydraulic system shown in the Patent No. 1,992,970, above referred to. No relief valve, therefore, is necessary in applicants' system to enable the aviator to assume instant control, since the hydraulic system is never locked, and the control surface may therefore be readily directly controlled by hand whether the automatic pilot is in operation or not, or whether or not the hydraulic system has failed.

Relative motion at right angles to the described motion between pick-off transformer 67 and armature 68 occurs when a torque is exerted tending to rotate member 57 about the axis of shaft 62 for the purpose of changing the angle of bank of the craft, thereby torsionally twisting sleeve 63' and displacing armature 68 relative to core 67. The signal thereby generated is applied to a second amplifier and servo system, similar to 50, 40, 45, 46, but not shown, to rotate the craft's ailerons.

Shaft 62 is fixed to a pulley 66 over which cable 60 passes, this cable being directly connected to the ailerons in tandem with the hydraulic motor of a servo system in the same manner as cable 61 for climb and dive control. Direct manual control of banking is thereby provided for emergencies should the servo or automatic pilot apparatus become inoperative.

It will be apparent that combined manual and servo control of the motion of the craft about a third axis may be provided for by the association of apparatus similar to that just described with the rudder controlling the craft's course.

The stiffness of diaphragm 64 and of the elastic sleeve 63' of hub member 63 may be made high in view of the small displacements required for servo booster control, so that direct manual control may be exerted without the pilot being aware of excessive "give" in the handling of the control column and wheel. The force amplification produced by this booster system may be controlled merely by suitably adjusting voltage divider 56, which thereby controls the proportionality between control signal amplitude and the yield of the elastic elements 63' or 64. Preferably, the system is so adjusted that the usual maximum human effort will produce a control signal providing maximum output from the servo 46, thereby utilizing the booster system to full effect.

In place of the combined double pick-off of Figs. 1 to 4, it will be clear that two separate pick-offs may be used. These pick-offs may be of the same three-legged type as here shown or may be of any other suitable type adapted to provide a pair of differentially varying alternating voltages whose difference will then provide a reversible-phase, variable-magnitude control signal of the type herein used. Alternatively, any other type of pick-off adapted to produce such a control signal directly may also be used.

One such type of pick-off may be an instrument similar to an ordinary induction voltage regulator, but provided with a pair of secondary windings 90 electrical degrees apart. At one position of the primary winding, equal voltages will be produced in the two secondary windings. As the primary is displaced to either side of this position, one or the other of the two secondary windings will have a larger voltage induced therein, whereby the difference of the secondary voltages will provide a signal of the type discussed above.

A circuit utilizing such a pick-off is shown in Fig. 5. Here the pick-off 67', which may replace pick-off 67 of Figs. 1 to 4 about either one of its axes of control, is shown diagrammatically. Its primary or exciting winding 72 is supplied with alternating current from a suitable source. The two secondary windings 73 and 73' are then applied to respective rectifiers 74 and 74', which, for lightness and durability are preferably dry full-wave rectifier bridges, such as of the copper oxide or selenium types. It will be clear that any other type of rectifier may also be utilized.

The outputs of rectifiers 74, 74', now in the form of unidirectional voltages of opposite polarity, are fed through a transfer switch 76 (when in the down position) to the respective coils 41 and 41' of torque motor 40, to control the booster servo system of Fig. 1. Suitable condensers 77 and 77' are also connected in parallel with the outputs of rectifiers 74 and 74'. In the upper position of transfer switch 76, the coils of torque motor 40 are energized from the output of amplifier 50 as shown in Fig. 1.

The present circuit offers several advantages over that of Fig. 1. Thus, as already described, amplifier 50 normally is provided with certain rate or anti-hunt circuits to provide anti-hunting control of the aircraft from the gyro 51.

The anti-hunting circuits in the amplifier 50 are designed to provide damping for the automatic control which includes the airplane's motion, and are not necessarily of the proper proportions to provide damping for the booster control. Such anti-hunting circuits, when used with the manually derived signal from pick-off 67, are likely to cause undesirable shocks and even oscillations in the control of the aircraft.

By the present circuit, the manual control signal is fed directly to the torque motor 40 and not at all through amplifier 50. It will be understood that the pick-off 67' is here adapted to produce an output voltage of sufficient magnitude to directly actuate the torque motor 40, and need not have a low voltage output, as does pick-off 67.

Furthermore, the reliability of the system is greatly increased by the present connection. Thus, if any of the circuits of amplifier 50 become inoperative for any reason, it will be clear that the manual booster control of Fig. 5 will still be fully operative, whereas that of Fig. 1 would be disabled at the same time that the automatic pilot control becomes disabled.

In the circuit of Fig. 5, condensers 77 and 77' serve to bypass the alternating current components derived from rectifiers 74 and 74', and provide smooth direct current for the control of torque motor 40. In addition, condensers 77 and 77' serve to provide a slight delay in the transfer of the signal from pick-off 67' to torque motor 40. That is, a sudden change in the position of pick-off 67', such as caused by a sudden actuation of the manual control 57, will produce a sudden increase in the signal output of rectifiers 74 and 74'. Before this increased signal can be applied to torque motor 40, it must first charge or discharge condensers 77 and 77', which thus introduce a time delay. Series chokes may be added to increase this time delay where necessary. This time delay is extremely advantageous in smoothing the control of the craft and in preventing regenerative oscillations which otherwise might occur.

It will be understood that the circuit of Fig. 5 may also be used with the pick-offs shown in Figs. 1 to 4. In this case, the coil 73, 73' may be considered to represent the respective halves of the secondary or output windings of each axis of the pick-off 67.

Fig. 6 shows a circuit alternative to that of Fig. 5 and using a different type of pick-off or signal generator. In this instance the pick-off or signal generator 67'' is shown as of the type having a primary winding 79 excited from a suitable source of alternating current, and a single center-tapped secondary winding 78 rotatable with respect to the primary winding 79. In construction, generator 67'' therefore may be similar to the usual simple induction regulator or variometer, or an ordinary self-synchronous device or "Selsyn" may be utilized by considering the rotor winding, for example, as primary winding 79 and one of its stator windings as the winding 78, if center-tapped.

It will be clear that in one relative position of windings 78 and 79, in which the magnetic axes of these windings are perpendicular, zero voltage will be induced in the secondary winding 78. For a slight displacement from this relative position in one sense, a particular alternating voltage corresponding in amplitude to the magnitude of this displacement will be induced in winding 78. For a displacement of the windings 78 and 79 in the opposite sense, a voltage will be induced in winding 78 varying similarly in magnitude but having a phase opposite to that produced by the first displacement. Accordingly, the voltage produced by winding 78 is essentially a reversible-phase, variable-magnitude voltage of a type suitable for use as a control signal, as described above.

To transform this signal voltage into a pair of differentially varying unidirectional currents for use with the torque motor 40, a reference or phasing voltage is applied in series with the center-tap of winding 78. This voltage may be derived from the same source supplying the primary winding 77, through a suitable phase-adjusting arrangement 81 of any conventional type, which is set so that this reference or phasing voltage will be either in phase coincidence or in phase opposition with the voltage induced in winding 78. Preferably, the reference voltage is chosen to have a magnitude greater than the maximum signal voltage induced in either of the halves of secondary winding 78 in order that it shall be effective over the complete range of operation.

The sums of this phasing voltage and the respective voltages produced by the respective halves of winding 78 are then rectified by respective rectifiers 82, 82', whose outputs are filtered by respective condensers 77, 77' and are then applied to the respective windings 41 and 41' of torque motor 40. Condensers 77, 77' have essentially the same function as in Fig. 5.

It will be seen that, in the absence of any voltage induced in winding 78, equal and opposite currents will be supplied to torque motor windings 41, 41', which effectively cancel one another with respect to control of the servo. Upon generation of a signal in winding 78, however, the signal voltage induced in one half of the secondary winding 78 will aid the phasing voltage. In the other half of this winding the signal voltage will oppose the reference voltage. The particular half of the winding 78 whose voltage will aid the reference voltage will depend upon the sense of the displacement of windings 78 and 79 from their neutral or zero voltage position. That is, upon reversing the sense of this displacement, the voltage induced in a particular half of the secondary winding 78 will reverse its phase from phase opposition to the reference voltage, for example, to phase coincidence, or vice versa.

Accordingly, the currents supplied to windings 41 and 41' will vary oppositely or differentially, and their difference will then correspond to the desired control signal from the manual controller 57. The remainder of the system will then operate as described in Figs. 1 and 5.

It will be clear that rectifiers 82 and 82', although illustrated as being of the half-wave type, may also be full-wave rectifiers, or any other type of rectifier.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system of the character described, the combination of, a control column mounted to move about a first axis, a wheel mounted on said column to move about a second axis, a manually operable member for moving said wheel and column about the respective axes thereof, an elastic sleeve connecting said wheel and member, an elastic diaphragm connecting said column and member, a first pick-off carried by said column for measuring stretch in said sleeve, and a second pick-off carried by said column for measuring stretch in said diaphragm.

2. In a system of the character described, the combination of, a control column mounted to move about a first axis, a wheel mounted on said column to move about a second axis, a manually operable member for moving said wheel and column about the respective axes thereof, an elastic sleeve connecting said wheel and member, an elastic diaphragm connecting said column and member, and an electrical pick-off having a cruciform-shaped armature providing an output in accordance with the stretch in said elastic sleeve and an output in accordance with the stretch in said diaphragm.

3. In a system of the character described, the combination of, a control column mounted to move about a first axis, a wheel mounted on said column to move about a second axis, a manually operable member for moving said wheel and column about the respective axes thereof, means for connecting said member to the wheel and the column including an elastic sleeve coaxially arranged with respect to said second axis having an elastic diaphragm fixed to one end thereof, a pick-off providing an output in accordance with the stretch in said sleeve, and a pick-off providing an output in accordance with the stretch in said diaphragm.

4. In a system of the character described, the combination of, a control column mounted to move about a first axis, a wheel mounted on said column to move about a second axis, a manually operable member for moving said wheel and column about the respective axes thereof, a stub shaft having a flange thereon connected to said member, an elastic sleeve extending from said flange having an elastic diaphragm fixed to the extended end thereof, and means for connecting the diaphragm to said column and wheel, and electrical means for measuring the stretch in said sleeve and diaphragm having an armature fixedly mounted on an extension of said flange.

5. A device as claimed in claim 4, in which said connecting means is a second sleeve that is rotatably mounted on said column having said diaphragm fixed to one end thereof and said wheel fixed to the other end thereof.

6. In a system of the character described, the combination of, a control column mounted to move about a first axis, a wheel mounted on said column to move about a second axis, a manually operable member for moving said wheel and column about the respective axes thereof, a stub shaft coaxially arranged with respect to said wheel having a flange thereon, said shaft being fixedly connected to said member, an elastic sleeve extending from said flange coaxial with said shaft having an elastic diaphragm fixed to the extended end thereof, a rigid sleeve rotatably mounted on said column having one end thereof connected to said diaphragm and the other end thereof connected to said wheel, and a two part pick-off for measuring stretch in said elastic sleeve and diaphragm having one part fixedly connected to the rigid sleeve and the other part fixedly mounted on an extension of said flange.

CARL A. FRISCHE.
GEORGE P. BENTLEY.
PERCY HALPERT.